United States Patent [19]

Mayama et al.

[11] Patent Number: 5,418,099
[45] Date of Patent: May 23, 1995

[54] ELECTROPHOTOGRAPHIC PHOTOSENSITIVE MEMBER, AND ELECTROPHOTOGRAPHIC APPARATUS AND DEVICE UNIT EMPLOYING THE SAME

[75] Inventors: Shinya Mayama, Yamato; Naoto Fujimura, Yokohama; Toshiyuki Yoshihara, Kawasaki; Nobuyuki Hanami, Matsudo; Kiyoshi Sakai, Hachioji; Hideki Anayama, Yokohama; Junichi Kishi; Hideyuki Ainoya, both of Tokyo; Katsumi Aoki, Yokohama, all of Japan

[73] Assignee: Canon Kabushiki Kaisha, Tokyo, Japan

[21] Appl. No.: 62,224

[22] Filed: May 18, 1993

[30] Foreign Application Priority Data

May 19, 1992 [JP] Japan ................. 4-150046
Jun. 30, 1992 [JP] Japan ................. 4-196129

[51] Int. Cl.$^6$ .......................................... G03G 5/087
[52] U.S. Cl. ............................. 430/58; 430/66; 430/96; 355/211
[58] Field of Search ............ 430/58, 59, 96, 66; 355/211

[56] References Cited

U.S. PATENT DOCUMENTS

| 4,851,314 | 7/1989 | Yoshihara .................... | 430/59 |
| 4,931,372 | 6/1990 | Takei et al. .................. | 430/69 |
| 5,208,127 | 5/1993 | Terrell et al. ................ | 430/59 |
| 5,208,128 | 5/1993 | Terrell et al. ................ | 430/59 |

FOREIGN PATENT DOCUMENTS

| 0429116 | 5/1991 | European Pat. Off. ....... | G03G 5/14 |
| 0538070 | 4/1993 | European Pat. Off. ....... | G03G 5/05 |
| 61-62039 | 3/1986 | Japan .................... | G03G 5/05 |
| 61-62040 | 3/1986 | Japan .................... | G03G 5/05 |
| 61-132954 | 6/1986 | Japan .................... | G03G 5/05 |

OTHER PUBLICATIONS

Patent Abstracts of Japan, vol. 14, No. 561 (P-1142), Dec. 1990.
Patent Abstracts of Japan, vol. 11, No. 366 (P-641), Nov., 1987.

*Primary Examiner*—John Goodrow
*Attorney, Agent, or Firm*—Fitzpatrick, Cella, Harper & Scinto

[57] ABSTRACT

The present invention relates to an electrophotographic photosensitive member comprising an electroconductive support and a photosensitive layer formed thereon: the surface layer of the electrophotographic photosensitive member containing a first copolymer of a first construction unit represented by Formula (1) and a second construction unit represented by Formula (2), and a second copolymer of a third construction unit represented by Formula (3) and a fourth construction unit represented by Formula (4):

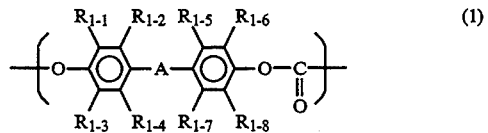

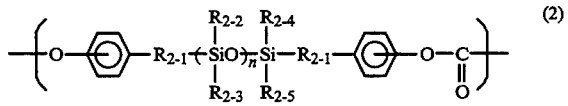

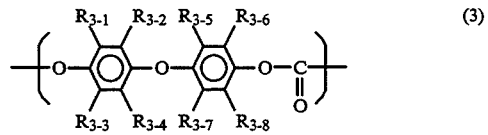

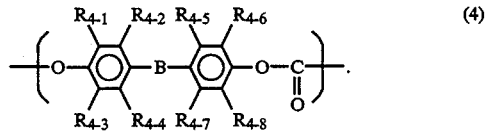

12 Claims, 1 Drawing Sheet

ELECTROPHOTOGRAPHIC PHOTOSENSITIVE MEMBER, AND ELECTROPHOTOGRAPHIC APPARATUS AND DEVICE UNIT EMPLOYING THE SAME

BACKGROUND OF THE INVENTION

1. Field of the Invention

The present invention relates to an electrophotographic photosensitive member. More particularly, the present invention relates to an electrophotographic photosensitive member having a surface layer containing a resin of a specified structure. The present invention further relates to an electrophotographic apparatus and a device unit employing the above electrophotographic photosensitive member.

2. Related Background Art

In recent years, many proposals have been presented for electrophotographic photosensitive members employing an organic photoconductive material because of non-pollution, high productivity, ease of material design, and future prospect thereof. Some of them are practically used.

The electrophotographic photosensitive member is required to have electric, mechanical, and optical properties satisfying the electrophotographic process to which the member is applied. In particular, for the photosensitive member for repeating use what is required is durability against external electric or mechanical force applied to the surface of the member during the process of corona charging, toner development, image transfer onto paper, and surface cleaning. Specifically, the photosensitive member is required not to undergo deterioration, due to ozone evolved during corona charging, such as sensitivity reduction, rise of residual potential, and decrease of chargeability and to be resistant to abrasion and scratching on the surface caused by sliding friction during image transfer and surface cleaning process.

Since the surface of the photographic member is a layer composed mainly of a resin, the properties of the resin greatly affect the properties of the surface of the photosensitive member. Conventionally, a polycarbonate resin which has a skeleton unit of bisphenol A (hereinafter referred to as "bisphenol A type polycarbonate") is employed as the resin satisfying the above requirements.

The bisphenol A type polycarbonate resin, however, does not satisfy all the requirements for the resin for photosensitive members. The bisphenol A type polycarbonate resin involves the problems below:

(1) The resin is poor in solubility, and is soluble in practice only in limited solvents, namely some halogenated aliphatic hydrocarbons such as dichloromethane and 1,2-dichloroethane. Since such halogenated aliphatic hydrocarbons have a low boiling point, the coating layer is liable to whiten when a photosensitive member is produced by use of a coating solution prepared with such a solvent, and the control of the process is troublesome in adjustment of the solid content of the coating solution.

(2) The resin is partly soluble in a few solvents other than the halogenated aliphatic hydrocarbons, such as tetrahydrofuran, dioxane, cyclohexanone, and the mixed solvents thereof. However, these solutions are unstable in storage, turning into gels within a few days and are not suitable for production of photosensitive members.

(3) A polycarbonate having a main chain skeleton consisting only of bisphenol A or a bisphenol A derivative is liable to cause solvent cracking.

(4) A film formed from a conventional polycarbonate resin does not have sufficient lubricity, and is liable to be scratched which causes image defects. The film tends to give insufficient cleaning caused by rapid deterioration of the cleaning blade or turn-over of the cleaning blade to shorten the life of the photosensitive member. Further, the resin has relatively high surface free energy, which induces sticking of a developing agent onto the surface of the photosensitive member causing spot-like image defects.

Hitherto, the problems of solution stability mentioned in the above items (1) and (2) are solved by use of a polycarbonate Z resin having a bulky cyclohexylene group as the polymer structure unit. However, as indicated in the above item (3), the polycarbonate Z resin and the polycarbonate A resin exhibit relatively large shrinkage on forming a coating film with the solution by casting, which sometimes causes residual stress in the interior of the coating film, rendering the above resins less resistant to stress corrosion. To solve this problem, Japanese Laid-Open Patent No. 61-62040 discloses the use of a mixture of the polycarbonate A resin with the polycarbonate Z resin to suppress stress cracking, and Japanese Laid-Open Patent No. 61-62039 discloses copolymerization of bisphenol A and bisphenol Z to suppress the cracking. These methods, however, are still unsatisfactory to give the resin sufficient resistance against solvent cracking.

As mentioned in the above item (4), an ordinary polycarbonate resin exhibits relatively low lubricity to the cleaning blade used in the electrophotographic process. The low lubricity causes turning-over of the cleaning blade due to the deterioration of the cleaning blade, thereby leading to insufficient cleaning. Further the low lubricity often results in scratch formation on the photosensitive member surface owing to formation on strong force applied thereto. To solve this problem, silicone oil is applied, or as disclosed in Japanese Laid-Open Patent No. 61-132954, polydimethylsiloxane blocks are incorporated into the polycarbonate resin by copolymerization.

The addition of the silicone oil has disadvantages in that electric characteristics, specifically sensitivity and residual potential characteristics are impaired by the silicone oil, and the silicone oil is lost during repeated use and thereby the lubricity decreases. The aforementioned copolymerization of the polydimethylsiloxane block gives relatively good lubricity to the surface layer of the photosensitive member. However, conventional polydimethylsiloxane copolymers, when dissolved in a solvent, tend to become turbid and white, or tend to turn into a gel, and do not give satisfying durability for the surface layer of an electrophotographic photosensitive member.

Furthermore, in recent years, a low molecular compound such as a charge-transporting substance is often incorporated in the photosensitive layer in a large amount to obtain the high sensitivity required for the organic electrophotographic photosensitive member. The low molecular substance may deposit during a long term of storage of such photosensitive member to cause layer separation.

The present invention solves the above problems of conventional electrophotographic photosensitive members.

SUMMARY OF THE INVENTION

The present invention intends to provide an electrophotographic photosensitive member which shows excellent resistance to solvent cracking, having excellent lubricity, excellent abrasion resistance, causing no toner sticking and no additive deposition.

The present invention also intends to provide an electrophotographic apparatus and a device unit employing the above electrophotographic photosensitive member.

The electrophotographic photosensitive member according to the present invention comprises an electroconductive support and a photosensitive layer formed thereon, the surface layer of the electrophotographic photosensitive member containing a first copolymer of two kinds of units, a first construction unit represented by Formula (1) and a second construction unit represented by Formula (2), and a second copolymer of other two kinds of units, a third construction unit represented by Formula (3) and a fourth construction unit represented by Formula (4):

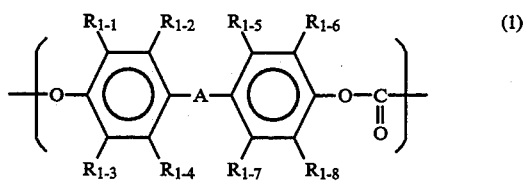

wherein A is a group of alkylidene, arylene, arylenedialkylidene, —O—, —S—, —CO—, —SO—, or —SO$_2$—, and R$_{1-1}$ to R$_{1-8}$ are independently a hydrogen atom, an alkyl group, an aryl group, or a halogen atom;

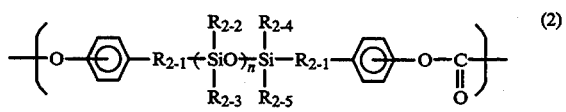

wherein R$_{2-1}$ is an alkylene group or an alkylidene group, and R$_{2-2}$ to R$_{2-5}$ are independently hydrogen atom, an alkyl group, or an aryl group, and n is an integer of 1 to 200;

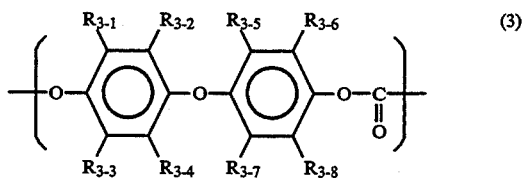

wherein R$_{3-1}$ to R$_{3-8}$ are independently a hydrogen atom, an alkyl group, an aryl group or a halogen atom;

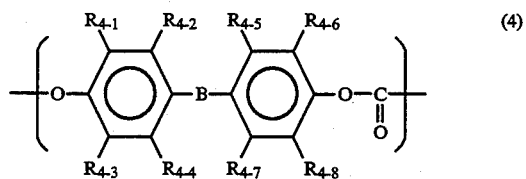

wherein B is an alkylidene group, an arylene group, and an arylenedialkylidene group, and R$_{4-1}$ to R$_{4-8}$ are independently a hydrogen atom, an alkyl group, an aryl group or a halogen atom.

The electrophotographic apparatus and the device unit according to the present invention comprise the aforementioned electrophotographic photosensitive member.

DETAILED DESCRIPTION OF THE PREFERRED EMBODIMENT

Figure 1:
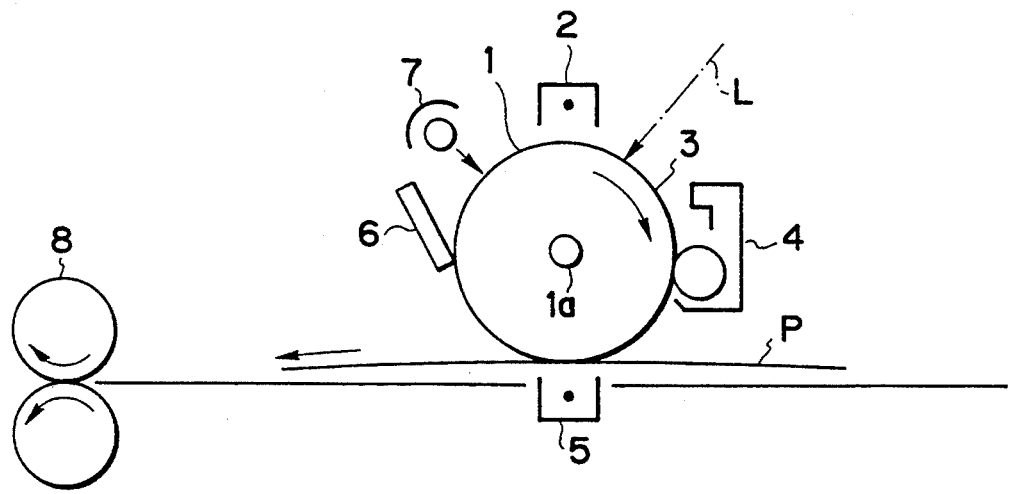
FIG. 1 shows a schematic constitution of an electrophotographic apparatus employing an electrophotographic photosensitive member of the present invention.

The electrophotographic photosensitive member according to the present invention has a surface layer containing a first copolymer consisting of a first construction unit represented by Formula (1) and a second construction unit represented by Formula (2), and a second copolymer of a third construction unit represented by Formula (3) and a fourth construction unit represented by Formula (4):

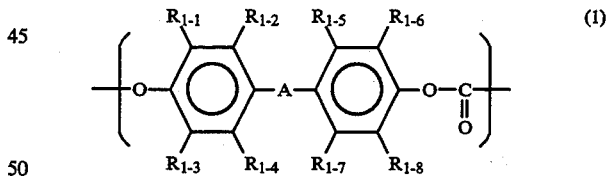

wherein A is a group of alkylidene, arylene, arylenedialkylidene, —O—, —S—, —CO—, —SO—, or —SO$_2$—, and R$_{1-1}$ to R$_{1-8}$ are independently a hydrogen atom, an alkyl group, an aryl group, or a halogen atom;

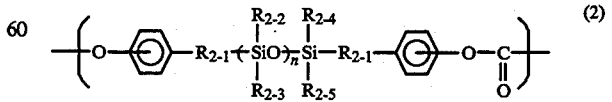

wherein R$_{2-1}$ is an alkylene group or an alkylidene group, and R$_{2-2}$ to R$_{2-5}$ are independently hydrogen atom, an alkyl group, or an aryl group, and n is an integer of 1 to 200;

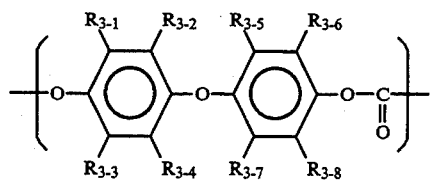 (3)

wherein $R_{3-1}$ to $R_{3-8}$ are independently a hydrogen atom, an alkyl group, an aryl group or a halogen atom;

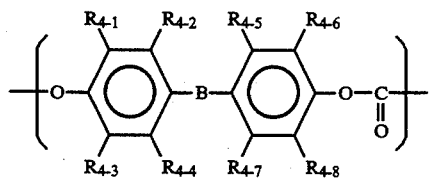 (4)

wherein B is an alkylidene group, an arylene group, and an arylenedialkylidene group, and $R_{4-1}$ to $R_{4-8}$ are independently a hydrogen atom, an alkyl group, an aryl group or a halogen atom.

In the above formulas, the alkyl group includes methyl, ethyl, and propyl. The aryl group includes phenyl, naphthyl, and biphenyl. The alkylene group includes methylene, ethylene, and propylene. The alkylidene group includes methylidene, ethylidene, propylidene, and cyclohexylidene. The arylene group includes phenylene, naphthylene, and biphenylene. The arylenedialkylidene group includes phenylenedimethylidene. The halogen atom includes fluorine, chlorine, and bromine. The above groups may be substituted by a substituent such as the aforementioned alkyl, aryl, or halogen.

The copolymer having the constitution unit having the first construction unit represented by Formula (1) and the second construction unit represented by Formula (2) (hereinafter this copolymer is referred to as "Copolymer A") preferably has the construction unit of Formula (2) in the ratio of from 0.1 to 50% by weight, more preferably from 0.1 to 30% by weight of the entire Copolymer A. The group A in Formula (1) is preferably propylidene or cyclohexylidene. The group $R_{2-1}$ is preferably ethylene, propylene, or isopropylene, and n is preferably an integer of 5 to 100 in Formula (2).

Copolymer A may be prepared by interfacial polymerization of a bisphenol represented by Formula (5) below with a bisphenol represented by Formula (6) in the presence of phosgene, a carbonate ester, or chloroformate:

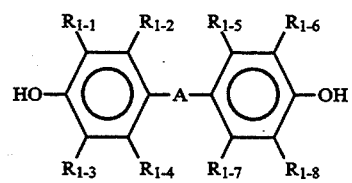 (5)

wherein A, and $R_{1-1}$ to $R_{1-8}$ are the same as those defined above;

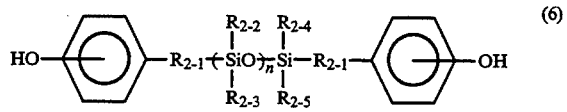 (6)

wherein $R_{2-1}$ to $R_{2-5}$ are the same as those defined above.

Preferred examples of the bisphenol represented by Formula (5) are shown below without limiting it thereto.

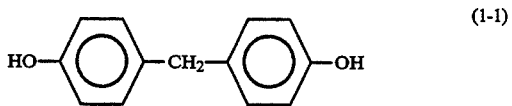 (1-1)

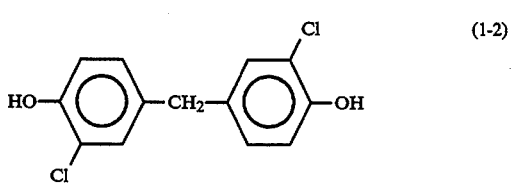 (1-2)

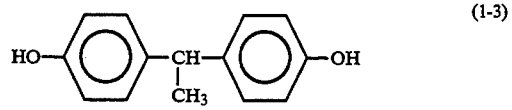 (1-3)

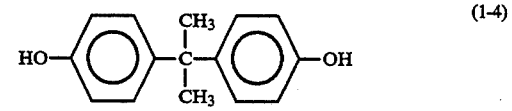 (1-4)

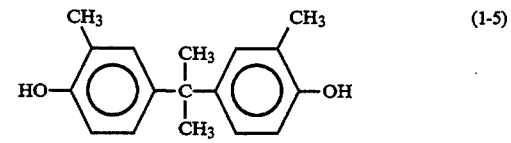 (1-5)

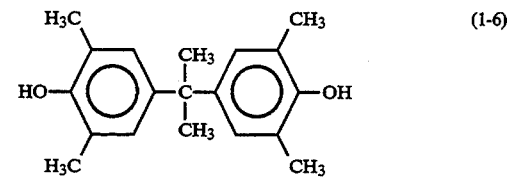 (1-6)

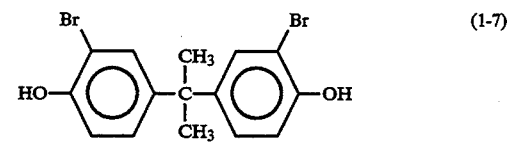 (1-7)

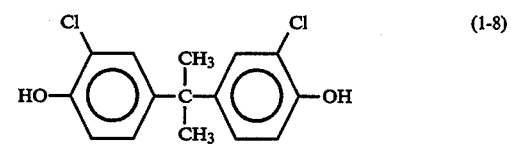 (1-8)

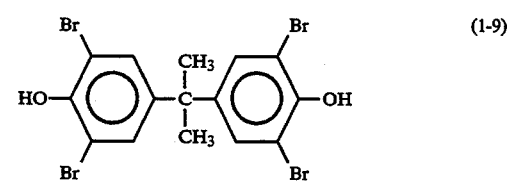 (1-9)

(1-10) 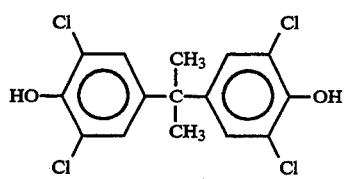
(1-11) 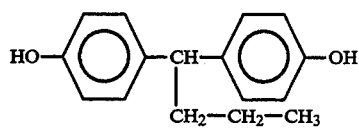
(1-12) 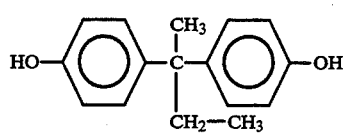
(1-13) 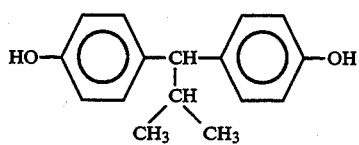
(1-14) 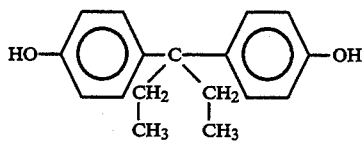
(1-15) 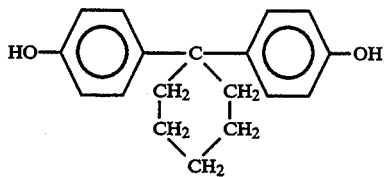
(1-16) 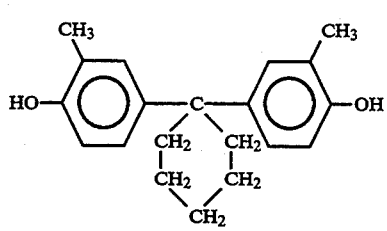
(1-17) 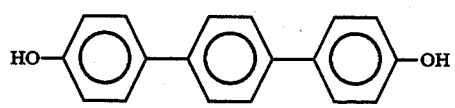
(1-18) 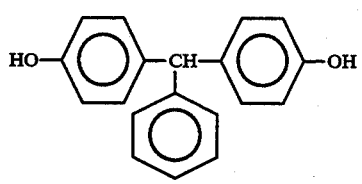
(1-19) 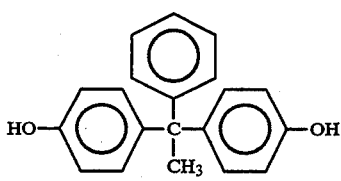
(1-20) 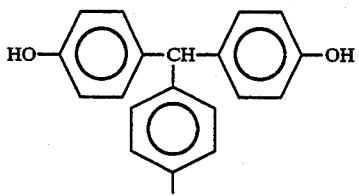
(1-21) 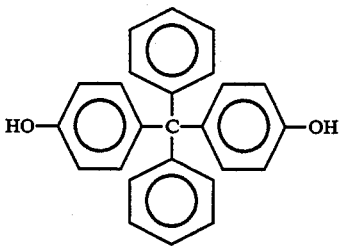
(1-22) 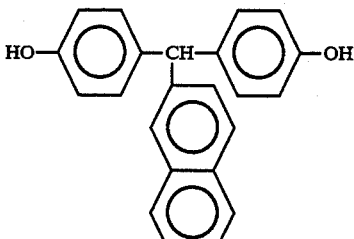
(1-23) 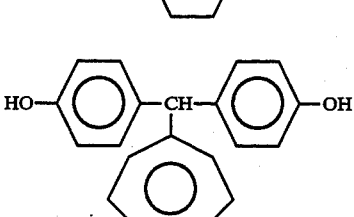
(1-24) 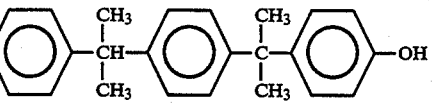
(1-25) 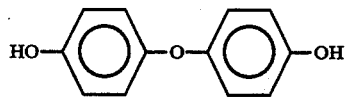
(1-26) 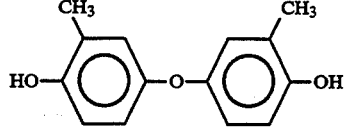

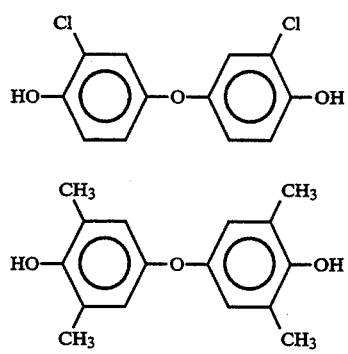 (1-27)
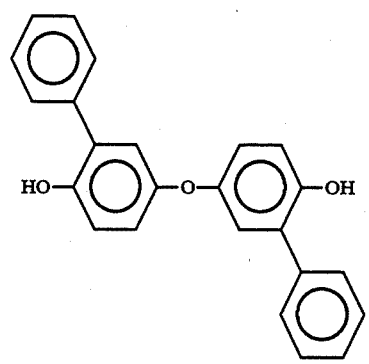 (1-28)
(1-29)
(1-30)
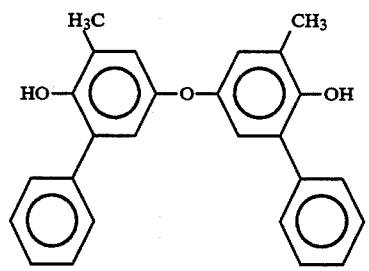
(1-31)
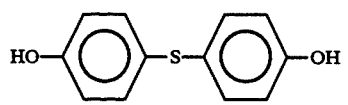 (1-32)
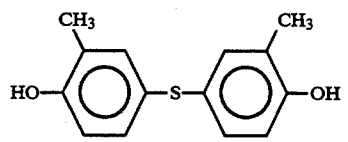 (1-33)
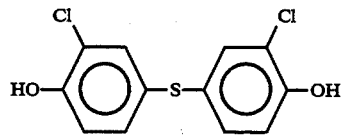 (1-34)
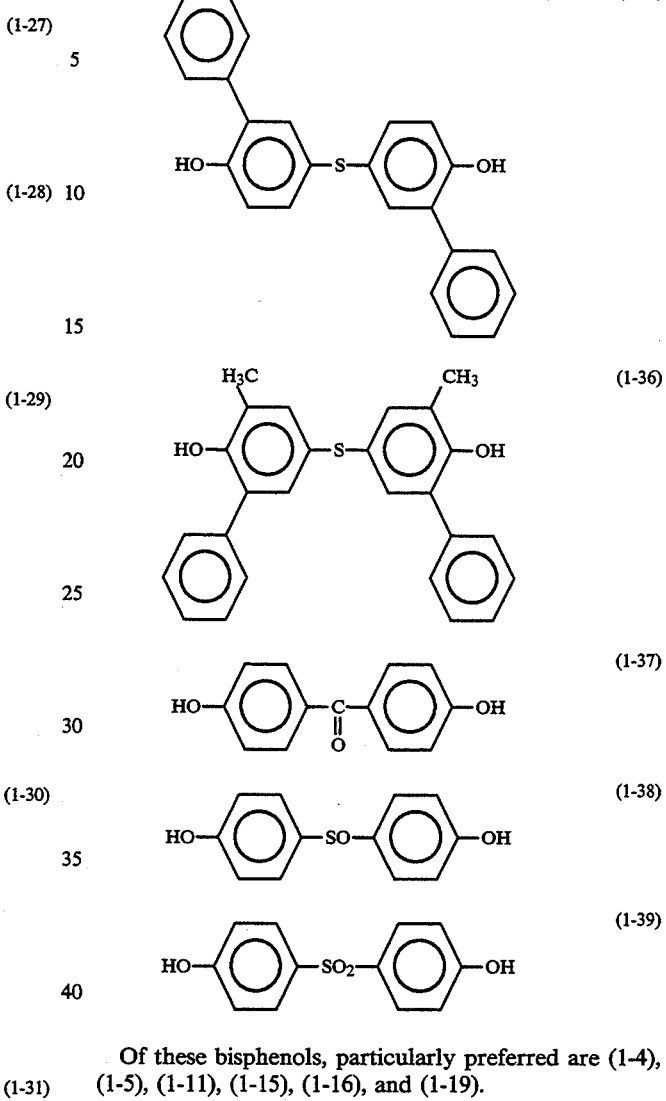
(1-35)
(1-36)
(1-37)
(1-38)
(1-39)
Of these bisphenols, particularly preferred are (1-4), (1-5), (1-11), (1-15), (1-16), and (1-19).
Preferred examples of the bisphenol represented by Formula (6) are shown below without limiting it thereto.
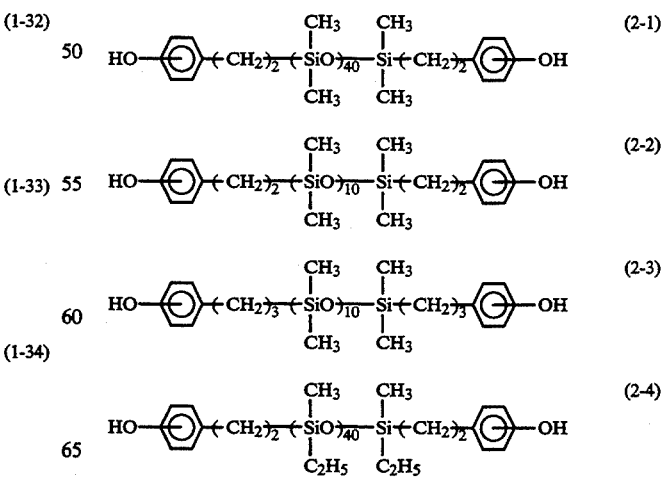
(2-1)
(2-2)
(2-3)
(2-4)

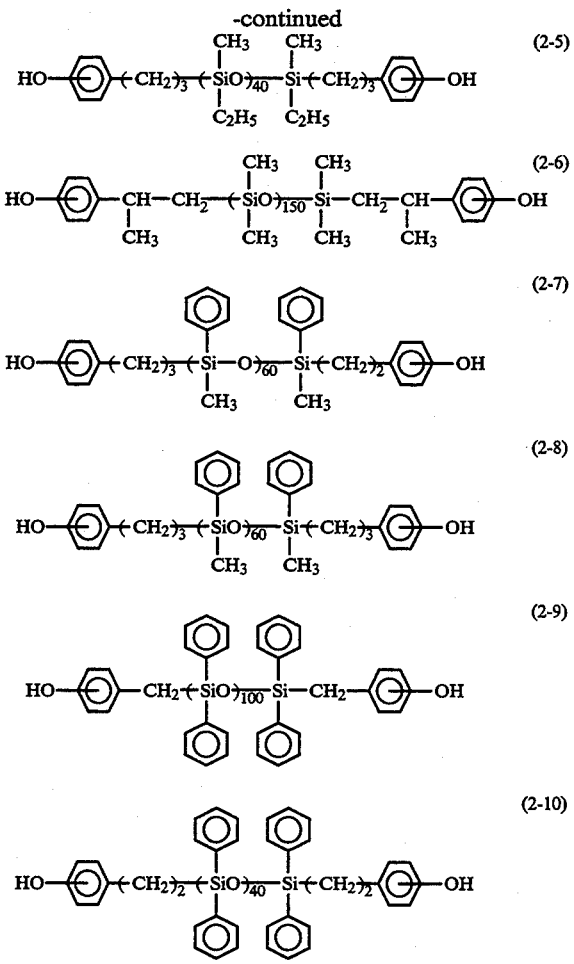

Synthesis Example (Synthesis of Copolymer A)

In 45 liters of water, 3.8 kg of sodium hydroxide was dissolved. In the solution kept at a temperature of 20° C., were dissolved 7.2 kg of 2,2-bis(4-hydroxyphenyl)-cyclohexane (viscosity-average molecular weight: $2.20 \times 10^4$), 1.5 kg of a polydimethylsiloxane derivative represented by the formula below (X-22-165B, made my Shin-Etsu Chemical Co., Ltd.),

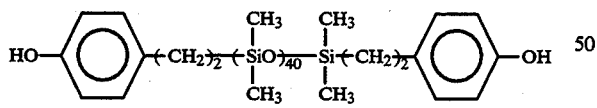

and 8 g of hydrosulfite. Thereto 32 liters of methylene chloride was added. Further thereto, 158 g of p-t-butyl-phenol was added with stirring, and 3.5 kg of phosgene was blown into the mixture in 60 minutes.

After the blowing-in of phosgene, the reaction mixture was agitated vigorously and emulsified, and 8 g of triethylamine was added thereto. The mixture was further agitated for about one hour to allow polymerization to proceed.

The polymerization mixture was separated into an aqueous phase and an organic phase. The organic phase was neutralized with phosphoric acid, and washed repeatedly with water until pH of the solution became neutral. 35 liters of isopropanol was added thereto to precipitate the formed polymer. The precipitate was collected by filtration, and dried. Consequently, the copolymer was obtained as a white powder, which was represented by the formula below (the copolymerization ratio being shown in weight ratio) having a viscosity-average molecular weight of $2.8 \times 10^4$. The composition of the copolymer was measured by infrared spectroscopy.

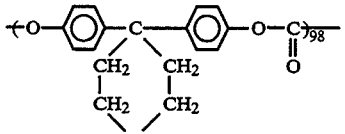

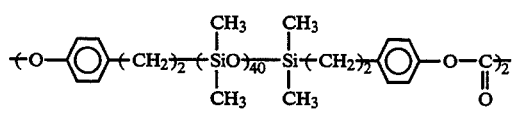

The copolymer having the construction unit represented by Formula (3) and the construction unit represented by Formula (4) (hereinafter this copolymer is referred to as "Copolymer B") comprises the construction units of Formula (3) and Formula (4) preferably in the molar ratio of from 5:95 to 95:5, more preferably from 30:70 to 70:30, still more preferably from 40:60 to 60:40.

Copolymer B may be prepared by using the bisphenol represented by Formula (7) and the bisphenol represented by Formula (8) in a similar manner as in preparation of Copolymer A:

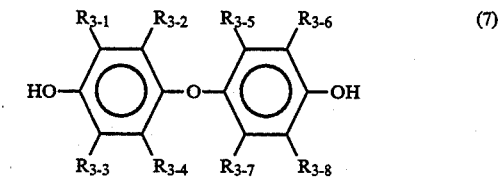

wherein $R_{3\text{-}1}$ to $R_{3\text{-}8}$ are the same as defined above,

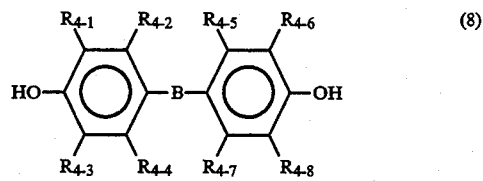

wherein B, and $R_{4\text{-}1}$ to $R_{4\text{-}8}$ are the same as defined above.

Preferred specific examples of the bisphenol represented by Formula (7) are those of Formulas (1-25) to (1-30). Of these, particularly preferred are those of Formulas (1-25) and (1-28).

Preferred specific examples of the bisphenol represented by Formula (8) are those of Formulas (1-1) to (1-24). Of these, particularly preferred are those of Formulas (1-4), (1-5), and (1-15).

The mixing ratio of Copolymer A and Copolymer B in the present invention is preferably in the range of from 1:99 to 70:30, more preferably from 5:95 to 50:50.

The surface layer in the present invention preferably contains further a polycarbonate resin having a construction unit represented by Formula (9) below (hereinafter this polymer being referred to as Polymer C) in view of improvement of resistance to solvent cracking and resistance to toner sticking:

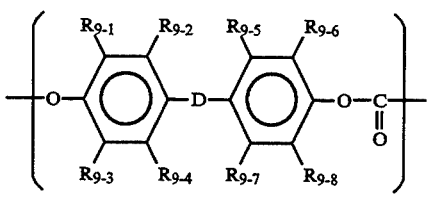

wherein D is a group of alkylidene, arylene, or arylenedialkylidene; and $R_{9-1}$ to $R_{9-8}$ are respectively a hydrogen atom, an alkyl group, an aryl group or a halogen atom.

In this case, the polymer mixture preferably contains Copolymer A in 5 to 20% and Copolymer B in 5 to 40% based on weight of the entire polymer mixture, and the mixing ratios of Copolymer A and the mixing ratio of B are preferably not more than the mixing ratio of Polymer C.

The resin represented by Formula (9) (Polymer C) may be prepared by using a corresponding bisphenol in a similar manner as in the preparation of Copolymer A. Preferred specific examples of the bisphenol represented by Formula (9) are those of Formulas (1-1) to (1-24). Of these, particularly preferred are (1-4), (1-5), (1-8), (1-15), (1-16), and (1-21), and more particularly (1-4) and (1-15).

The copolymers and the polymer used in the present invention may have a molecular weight in any range provided that the viscosity is suitable to form a coating film of suitable thickness. The copolymers and the polymer has preferably a viscosity-average molecular weight of from 10,000 to 100,000, more preferably from 20,000 to 60,000.

The present invention provides a coating film having excellent surface lubricity. The aforementioned polymers and copolymers are highly soluble in an ordinary solvent such as tetrahydrofuran, dioxane, cyclohexanone, benzene, toluene, xylene, monochlorobenzene, dichloromethane, and dichlorobenzene, and mixtures thereof, and are less liable to cause gelation of the solution which shortens the pot life, giving excellent characteristics in electrophotographic properties, production process stability, and quality stability.

The copolymers of the present invention may have more than one kind of construction unit (1) or (3). The same is for the construction unit (2) or (4).

The present invention improves the above-mentioned properties such as resistance to solvent-cracking, resistance to toner sticking, and surface lubricity, and accordingly gives much more excellent properties than those given by single use of Copolymer A, Copolymer B, or Polymer C.

The construction unit represented by Formula (2) of Copolymer A is introduced to impart appropriate flexibility to the polycarbonate resin and to reduce the surface free energy, whereby the resistance to solvent-cracking and the resistance to toner sticking are improved.

Copolymer B is introduced to reduce further the crystallinity of the polymer.

The above-described structure of the polycarbonate resin mixture employed in the present invention possesses low crystallinity and extremely small internal stress during film formation in comparison with conventional polycarbonate resins, thus preventing the solvent crack. Further, the above structure is considered to lower the surface energy, whereby the toner sticking and lubricity is improved.

The copolymers of the present invention is incorporated in the surface layer of the electrophotographic photosensitive member. The surface layer may either be a photosensitive layer or be a surface protection layer formed on the photosensitive layer.

The photosensitive layer may be of a monolayer type in which both a charge-generating substance and a charge-transporting substance are contained, or may be of a lamination type in which functionally separated layers of a charge-generating layer containing a charge-generating substance and a charge-transporting layer containing a charge-transporting substance are provided.

The charge-generating layer is obtained by application and drying of a liquid dispersion of a charge-generating substance in a binder resin. The charge-generating substance includes azo pigments such as Sudan Red, and Dian Blue; quinone pigments such as pyrenequinone, and anthanthrone; quinocyanine pigments; perylene pigments; indigo pigments such as indigo, and thioindigo; azulenium salt pigments; and phthalocyanine pigments such as copper phthalocyanine. The binder resin is at least the copolymers of the present invention when the charge-generating layer is the surface layer. When the charge-generating layer is not the surface layer, a resin other than the copolymers of the present invention may be used. Such a resin includes polyester resins, acrylic resins, polyethylene resins, polypropylene resins, polyvinylcarbazole resins, phenoxy resins, polycarbonate resins, polyvinylbutyral resins, polystyrene resins, polyvinylacetate resins, polysulfone resins, polyarylate resins, and vinylidene chlorideacrylonitrile copolymers.

The ratio of the charge-generating substance to the binder resin is preferably in the range of from 1:5 to 5:1, more preferably from 1:2 to 3:1. The thickness of the charge-generating layer is preferably not more than 5 μm, more preferably from 0.05 to 2 μm.

The charge-transporting substance in the present invention includes electron-transporting substances and positive hole-transporting substances. The electron-transporting substances include electron-attracting substances such as chloranil, tetracyanoethylene, tetracyanoquinodimethane, 2,4,5,7-tetranitro-9-fluorenone, 2,4,5,7-tetranitroxanthone, and 2,4,8-trinitrothioxanthone, and polymerized products of such electron-attracting substances.

The positive hole-transporting substances include pyrene, N-ethylcarbazole, N-methyl-N-phenylhydrazino-3-methylidene-9-ethylcarbozole, N,N-diphenylhydrazino-3-methylidene-10-ethylphenothiazine; hydrazones such as p-diethylaminobenzaldehydo-N,N-diphenylhydrazone, p-pyrrolidinobenzaldehydo-N,N-diphenylhydrazone, and p-diethylbenzaldehydo-3-methylbenzothiazolinone-2-hydrazone; pyrazolines such as 2,5-bis(p-diethylaminphenyl)-1,3,4-oxadiazole, 1-phenyl-3-(p-diethylaminostyryl)-5-(p-diethylaminophenyl)pyrazoline, 1-[pyridyl(2)]-3-(p-diethylaminostyryl-5-(p-diethylaminophenyl)pyrazoline, 1-[pyridyl(3)]-3-(p-diethylaminostyryl)-5-(p-diethylaminophenyl)-pyrazoline, 1-[pyridyl(2)]-3-(p-diethylaminostyryl)-4-methyl-5-(p-diethylaminophenyl)pyrazoline, 1-phenyl-3-(p-diethylaminostyryl)-4-methyl-5-(p-diethylaminophenyl)pyrazoline, and spiropyrazoline; styryl compounds such as a-phenyl-4-N,N-diphenylaminostilbene, N-ethyl-3-(d-phenylstyryl)carbazole, 9-dibenzylaminobenzylidene-9H-fluorenone, and 5-p-ditolylaminobenzylidene-5H-dibenzo[a,d]cycloheptene; oxazole compounds such as 2-(p-diethylaminostyryl)-6-diethylaminobenzoxazole, and 2-(p-diethylaminophenyl)-4-(p-dimethylaminophenyl)-5-(2-chlorophenyl)oxazole; thiazole compounds such as 2-(p-diethylaminostyryl)-6-diethylaminobenzothiazole; triarylmethane compounds such as bis(4-diethylamino-2-methylphenyl)-phenylmethane; polyarylalkanes such as 1,1-bis(4-N,N-diethylamino-2-methylphenyl)heptane, and 1,1,2,2-tetrakis(4-N,N-dimethylamino-2-methylphenyl)ethane; triphenylamine, poly-N-vinylcarbazole, polyvinylpyrene, polyvinylanthracene, polyvinylacridine, poly-9-vinylanthracene, pyreneformaldehyde resins, and ethylcarbazole-formaldehyde resins. In addition to the above organic charge-transporting substances, inorganic materials such as selenium, selenium-tellurium, amorphous silicon, and cadmium sulfide are also useful as the charge-transporting substance. Of the above substances, the ten substances below are particularly preferred.

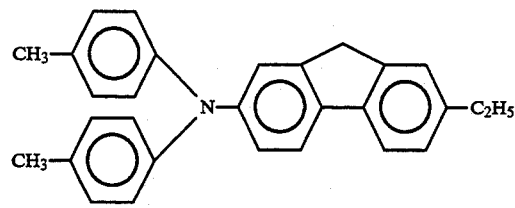

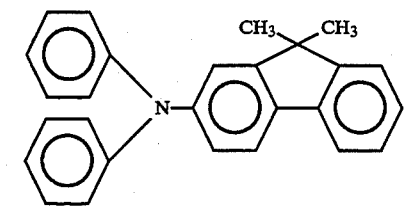

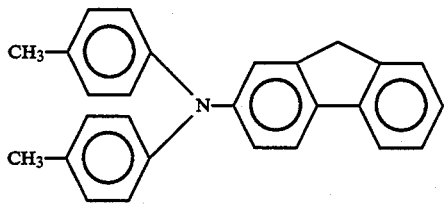

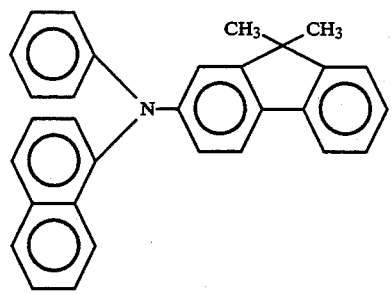

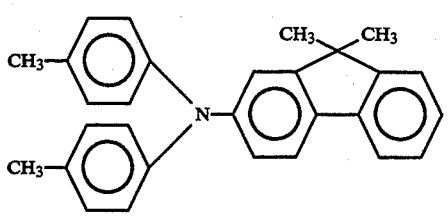

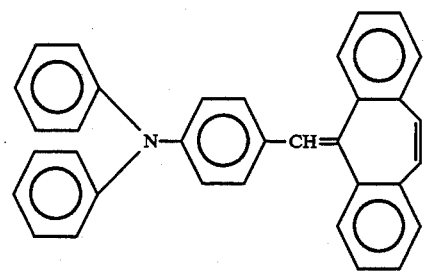

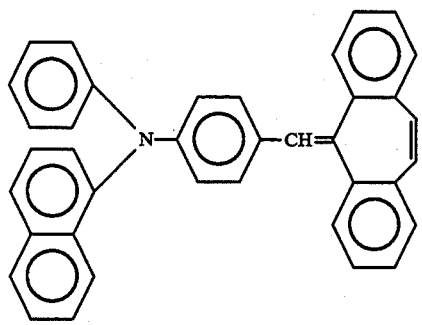

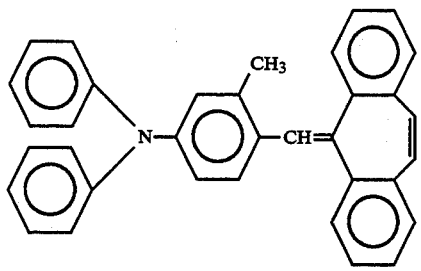

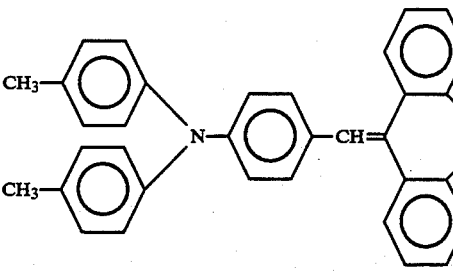

-continued

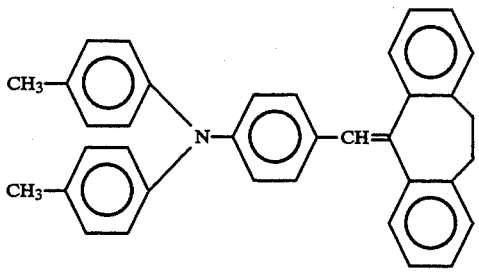

Generally, the charge-transporting substance is used by dissolving it in a suitable binder resin since the substance is poor in film-forming property. When the charge-transporting layer is the surface layer, the copolymers of the present invention function as the binder resin. When the surface layer is not the charge-transporting layer, a resin other than the copolymers of the present invention may be used. Such a resin is the same as the one mentioned before.

The charge-transporting layer is formed by applying and drying a solution of the aforementioned charge-transporting substance and the binder in a suitable solvent. The mixing ratio of the charge-transporting substance to the binder resin is preferably in the range of from 3:1 to 1:3, more preferably from 2:1 to 1:2 by weight.

The thickness of the charge-transporting layer is preferably in the range of from 5 to 40 $\mu$m, more preferably from 10 to 30 $\mu$m.

When the photosensitive layer is a monolayer type, the photosensitive layer is prepared by applying and drying a dispersion or a solution of the aforementioned charge-generating substance and the charge-transporting substance in a binder resin.

The copolymers of the present invention should be used as the binder resin when the photosensitive layer is the surface layer. When the photosensitive layer is not the surface layer, a resin other than the copolymers of the present invention may be used. Such a resin is the same as the one mentioned before.

The thickness of the monolayer type photosensitive layer is preferably in the range of from 5 $\mu$m to 40 $\mu$m, more preferably from 10 $\mu$m to 30 $\mu$m.

A surface protection layer may be provided in the present invention for the purpose of protecting the photosensitive layer from adverse effects of external mechanical, chemical, or electrical actions. The protection layer should contain at least copolymers of the present invention. The surface protection layer may be composed of a resin only, or may contain additionally an electroconductive substance such as the aforementioned charge-transporting substance and an electroconductive powder for the purpose of lowering the residual potential or other purposes. The electroconductive powder includes powdery metals, flakes of metals and short fibers of metals such as aluminum, copper, nickel, and silver; electroconductive metal oxides such as antimony oxide, indium oxide, and tin oxide; electroconductive polymers such as polypyrrole, polyaniline, and polymeric electrolytes; carbon black, carbon fiber, graphite powder, organic and inorganic electrolytes, and electroconductive powdery materials coated with the above electroconductive substance.

The thickness of the protection layer is determined in consideration of the electrophotographic properties and the durability, preferably in the range of from 0.2 $\mu$m to 15 $\mu$m, more preferably from 0.5 $\mu$m to 15 $\mu$m.

A subbing layer which has both a barrier function and an adhesive function may be provided between the electroconductive support and the photosensitive layer in the present invention.

The material for the subbing layer includes casein, polyvinyl alcohol, nitrocellulose, ethyleneacrylic acid copolymers, polyvinylbutyral, phenol resins, polyamides (e.g., nylon 6, nylon 66, nylon 610, copolymer nylon, alkoxymethylated nylons, etc.), polyurethanes, gelatin, and aluminum oxide. The thickness of the subbing layer is preferably in the range of from 0.1 $\mu\mu$m to 10 $\mu$m, more preferably from 0.1 $\mu$m to 5 $\mu$m.

An electroconductive layer may further be provided between the support and the subbing layer for the purpose of covering any defects of surface of the support, and for preventing interference fringes especially when an image is inputted with a laser beam. This electroconductive layer may be formed by applying and drying a liquid dispersion of electroconductive powdery material such as carbon black, a particulate metal, and a particulate powdery metal oxide in a suitable binder resin. The thickness of the electroconductive layer is preferably in the range of from 5 $\mu$m to 40 $\mu$m, more preferably from 10 $\mu$m to 30 $\mu$m.

The above layers may be formed by coating method such as dipping, spray coating, spinner coating, bead coating, blade coating, and beam coating.

The electroconductive support employed in the present invention may be made of electroconductive material such as aluminum, aluminum alloys, copper, zinc, stainless steel, vanadium, molybdenum, chromium, titanium, nickel, indium, gold, and platinum; or otherwise the support may be made of plastic or paper having thereon a vapor-deposited electroconductive layer of aluminum, an aluminum alloy, indium oxide, tin oxide, indium oxide-tin oxide alloy, or the like; plastics or paper having electroconductive particles impregnated therein; or plastic containing an electroconductive polymer.

The support may be in a shape of a drum, a sheet, or a belt which is suitable for the electrophotographic apparatus.

The image-holding member of the present invention is useful for a variety of electrophotographic apparatus such as electrophotographic copying machines, laser beam printers, LED printers, and liquid crystal shutter type printers, and for apparatus employing electrophotography technique such as apparatus for display, recording, light printing, and engraving, and facsimile machines.

FIG. 1 illustrates schematically an example of the constitution of an electrophotographic apparatus employing an electrophotographic photosensitive member of the present invention.

In FIG. 1, an electrophotographic photosensitive member 1 of the present invention is driven to rotate around the axis 1a in the arrow direction at a prescribed peripheral speed. The photosensitive member 1 is charged positively or negatively at the peripheral face uniformly during the rotation by an electrostatic charging means 2, and then exposed to image-exposure light L (e.g., slit exposure, laser beam-scanning exposure, etc.) at the exposure part 3 with an image-exposure means (not shown in the drawing), whereby an electrostatic latent image is successively formed on the peripheral surface in accordance with the exposed image.

The formed electrostatic latent image is developed with a toner by a developing means 4. The developed toner image is successively transferred by a transfer means 5 onto a surface of a transfer-receiving material P which is fed between the photosensitive member 1 and the transfer means 5, from a feeder (not shown in the drawing), synchronously with the rotation of the photosensitive member 1.

The transfer-receiving material P which has received the transferred image is separated from the photosensitive member surface, and introduced to an image fixing means 8 for image fixation and sent out from the copying machine as a duplicate copy.

The surface of the photosensitive member 1, after the image transfer, is cleaned with a cleaning means 6 to remove any remaining non-transferred toner, and is treated for charge elimination with a pre-exposure means 7 for repeating image formation.

The generally employed charging means 2 for uniformly charging the photosensitive member 1 is a corona charging apparatus. The generally employed transfer means 5 is also a corona charging means. In the electrophotographic apparatus, two or more of the constitutional elements of the above-described photosensitive member 1, the developing means 4, the cleaning means 6, etc. may be integrated into one device unit, which may be removable from the main body of the apparatus. For example, at least one of the charging means 2, the developing means 4, and the cleaning means 6 is combined with the photosensitive member 1 into one device unit which is removable from the main body of the apparatus by aid of a guiding means such as a rail in the main body of the apparatus.

When the electrophotographic apparatus is used as a copying machine or a printer, the optical image exposure light L may be projected onto the photosensitive member as reflected light or transmitted light from an original copy, or otherwise the information read out by a sensor from an original is signalized, and light is projected, onto a photosensitive member, by scanning with a laser beam, driving an LED array, or driving a liquid crystal shutter array according to the signal.

Figure 2:
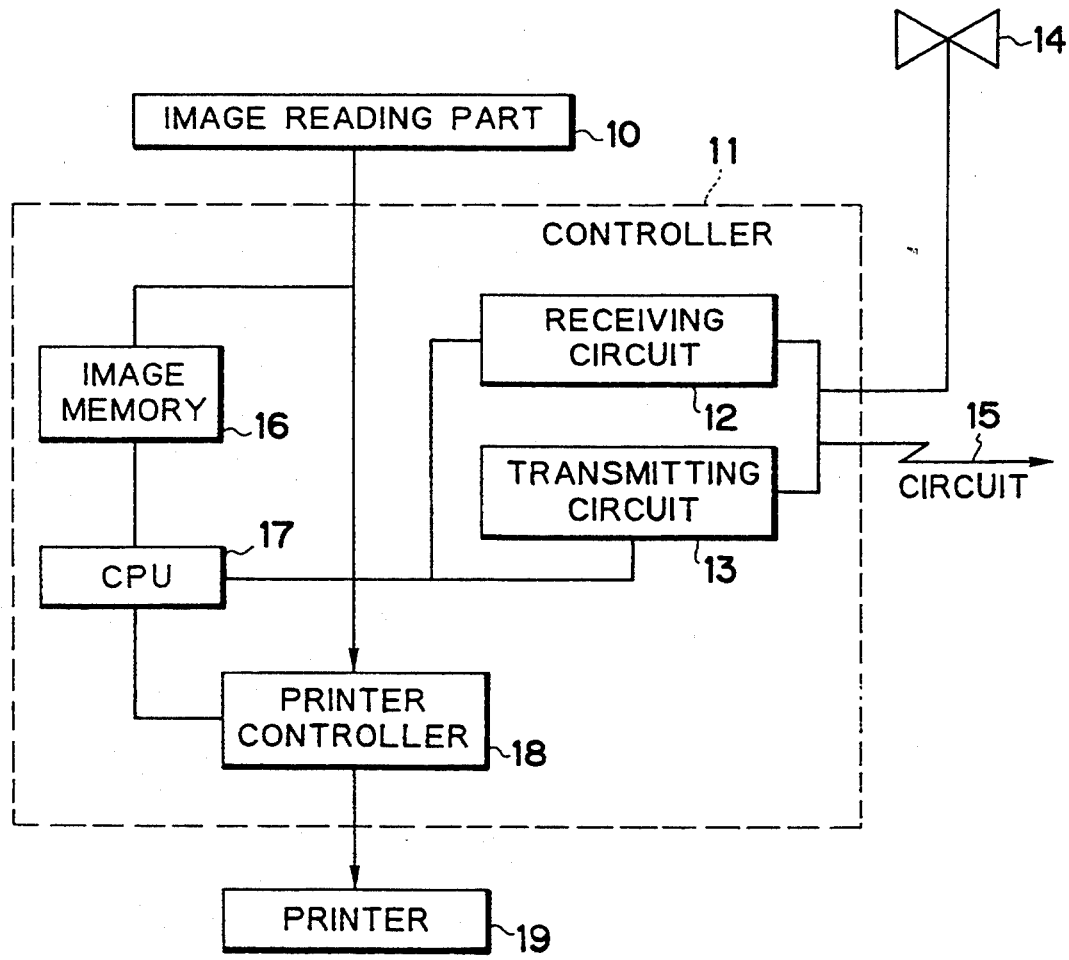
FIG. 2 shows an example of a block diagram of a facsimile system employing an electrophotographic photosensitive member of the present invention.

When the electrophotographic apparatus is used as a printer of a facsimile machine, the optical image exposure light L is employed for printing the received data. FIG. 2 is a block diagram of an example of this case.

A controller 11 controls the image-reading part 10 and a printer 19. The entire of the controller 11 is controlled by a CPU 17. Readout data from the image reading part 10 is transmitted through a transmitting circuit 13 to the other communication station. Data received from the other communication station is transmitted through a receiving circuit 12 to a printer 19. The image data is stored in an image memory 16. A printer controller 18 controls a printer 19. The numeral 14 denotes a telephone set.

The image received through a circuit 15, namely image information from a remote terminal connected through the circuit, is demodulated by the receiving circuit 12, treated for decoding of the image information in CPU 17, and successively stored in the image memory 16. When at least one page of image information has been stored in the image memory 16, the images are recorded in such a manner that the CPU 17 reads out one page of the image information, and sends out the one page of the decoded information to the printer controller 18, which controls the printer 19 on receiving the one page of the information from CPU 17 to record the image information.

During recording by the printer 19, the CPU 17 receives the subsequent page of information.

Images are received and recorded in the manner as described above.

The present invention is described in more detail by reference to examples. In Examples, "parts" is based on weight. Copolymer composition ratio of Copolymer A is expressed in weight ratio, and that of Copolymer B is expressed in molar ratio.

EXAMPLE 1

An electroconductive liquid dispersion was prepared by dispersing 10 parts of electroconductive titanium oxide powder coated with 10%-antimony oxide-containing tin oxide, 10 parts of electroconductive titanium oxide, 10 parts of methanol, 10 parts of methylcellosolve, and 0.001 part of silicone oil with glass beads of 1 mm diameter by means of a sand mill for 2 hours. The liquid dispersion was applied on an aluminum cylinder of 30 mm diameter and 260 mm length by dipping. The applied dispersion was cured by heating at 140° C. for 30 minutes to form an electroconductive layer of 18 $\mu$m thick.

On the formed electroconductive layer, a solution comprising 3 parts of N-methoxymethylated nylon and 3 parts of copolymer nylon in a mixed solvent of 65 parts of methanol and 30 parts of n-butanol was applied and dried to form a subbing layer of 0.5 $\mu$m thick.

A solution for a charge-generating layer was prepared by dispersing 3 parts of oxytitanium phthalocyanine, 2 parts of polyvinylbutyral (butyralation degree: 66%, weight-average molecular weight: 110,000) and 80 parts of cyclohexanone with glass beads of 1 mm diameter by means of a sand mill for 24 hours, and adding thereto 115 parts of methyl ethyl ketone. The resulting solution was applied on the aforementioned subbing layer by dip coating and was dried to form a charge-generating layer of 0.2 $\mu$m thick.

A solution for a charge-transporting layer was prepared by dissolving 10 parts of the charge-transporting substance represented by the formula below:

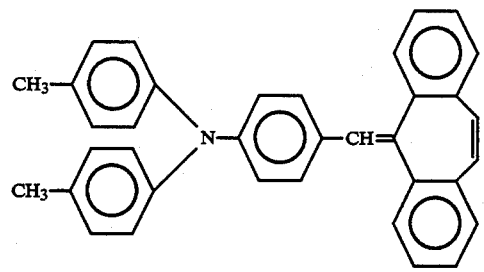

2 parts of the copolymer (viscosity-average molecular weight: $2.1 \times 10^4$) represented by the formula below as Copolymer A:

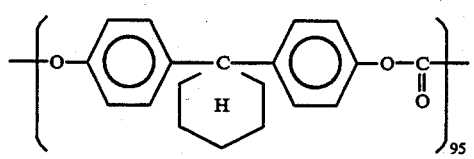

-continued

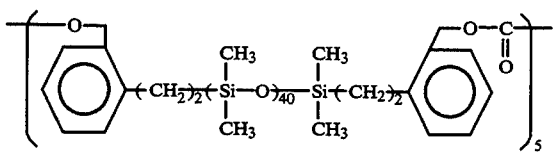

2 parts of the copolymer (viscosity-average molecular weight: $2.2 \times 10^4$) represented by the formula below as Copolymer B:

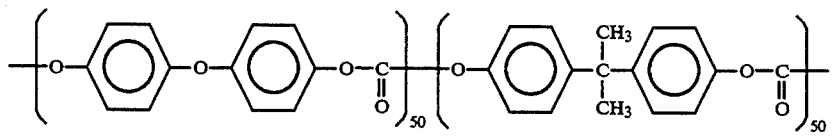

and 6 parts of the polymer (viscosity-average molecular weight: $2.4 \times 10^4$) represented by the formula below as Polymer C:

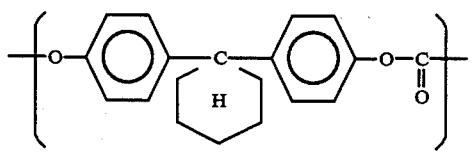

in a mixed solvent of 50 parts of monochlorobenzene and 10 parts of dichloromethane. This solution was applied on the charge-generating layer described above by dip coating, and was dried to form a charge-transporting layer of 20 μm thick.

The resulting electrophotographic photosensitive member was tested for surface lubricity, resistance to deposit formation, resistance to solvent cracking, resistance to toner sticking, resistance to abrasion, and sensitivity.

The surface lubricity is evaluated by measuring resistance to sliding of a copying-machine cleaning blade made of urethan rubber by bringing the cleaning blade into contact with the surface of the photosensitive member at a contact angle of 30° by means of a surface tester (HEIDON-14, made by Shinto Kagaku K.K.). The measured value is shown by the unit of mV/10 g-load. The lower value is desirable.

The resistance to deposit formation is evaluated by accelerated deposition test in such a manner that the photosensitive member is stored at 60° C. with a urethan cleaning blade being press-contacted to the surface of the photosensitive member, and deposition of a lower molecular compound is observed by microscopy. The resistance to deposit formation is shown by the lapse of time (days) before the deposition of a low monomolecular compound confirmed by microscopy observation.

The resistance to solvent cracking was evaluated by attaching finger fat or a lubricant (PS-158, made by Sanwa Yuka K.K.) onto the surface of the photosensitive member and by observing after 48 hours the occurrence of cracks under a microscope (×50), followed by macroscopic evaluation of the image obtained using that photosensitive member. The evaluation was carried out along following standard.

AA: no cracks on the photosensitive member, nor image defects due to cracks.

A: Cracks are observed on the photosensitive member, but no image defects due to cracks.

B: Cracks are observed on the photosensitive member, and one image defect due to cracks is observed.

C: Cracks are observed on the photosensitive member, and 2-10 image defects due to cracks are observed.

D: Cracks are observed on the photosensitive member, 11 or more image defects due to cracks are observed.

The resistance to toner sticking is evaluated in such a manner that the photosensitive member is mounted on a laser beam printer (Laser Jet III-Si, made by Hewlett Packard Co.), image formation is repeated continuously on 5000 sheets at 35° C. and 70% RH, and the number of residual (not cleaned) sticking matters are counted. The resistance to toner sticking is expressed by the number of printed sheets when 10 or more image defects due to residual matters are observed on a printed sheet.

The resistance to abrasion of the surface layer is evaluated by the amount of abrasion of the surface layer after the above 5000-sheet of image formation, using a film thickness determining apparatus (EC-8E2TY, FISCHER).

The sensitivity was evaluated by mounting the test photosensitive member to the above laser beam printer and measuring the quantity of light required for reducing the surface potential of the photosensitive member from −700 V to −200 V.

The results are shown in Table 1.

EXAMPLES 2 TO 5

Electrophotographic photosensitive members were prepared and evaluated in the same manner as in Example 1 except that Copolymer A, Copolymer B, and Copolymer C were used in amounts of 3 parts, 2 parts, and 5 parts (in Example 2); 5 parts, 5 parts, and 0 part (in Example 3); 4 parts, 4 parts, and 2 parts (in Example 4); and 0.5 parts, 4.5 parts, and 5 parts (in Example 5). The results are shown in Table 1.

COMPARATIVE EXAMPLES 1-5

Electrophotographic photosensitive members were prepared and evaluated in the same manner as in Example 1 except that Copolymer A, Copolymer B, and Polymer C were used in amounts of 10 parts, 0 part, and 0 part (in Comparative Example 1); 0 part, 10 parts, and 0 part (in Comparative Example 2); 0 part, 0 part, and 10 parts (in Comparative Example 3); and 0 part, 5 parts, and 5 parts (in Comparative Example 4); and 5 parts, 0 part, and 5 parts (Comparative Example 5). The results are shown in Table 1.

EXAMPLES 6-10 AND COMPARATIVE EXAMPLES 6-10

Electrophotographic photosensitive members were prepared and evaluated in the same manner as in Examples 1-5 and Comparative Examples 1-5 respectively except that, the charge-transporting substance was changed to 7 parts of the compound represented by the formula below:

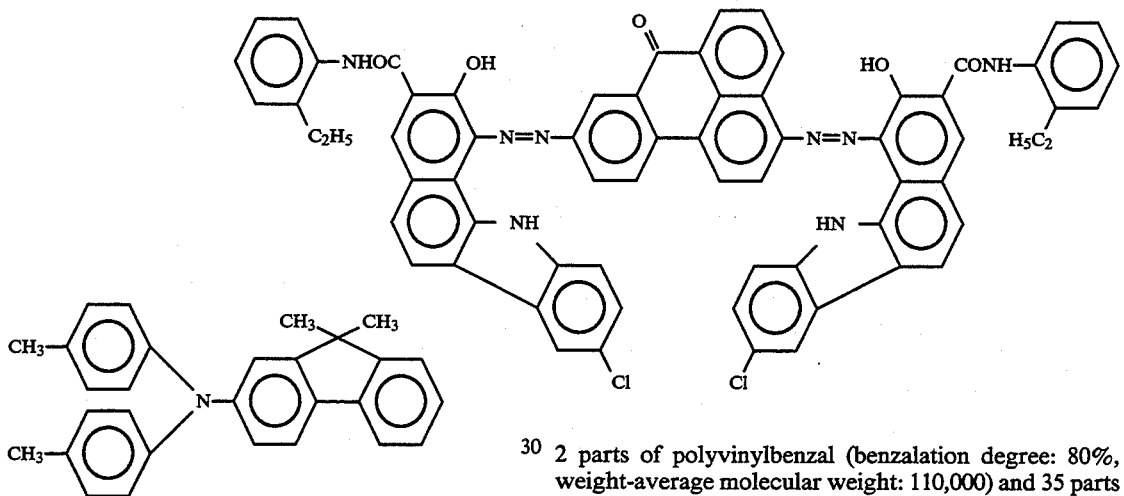

and 3 parts of the compound represented by the formula below (total 10 parts):

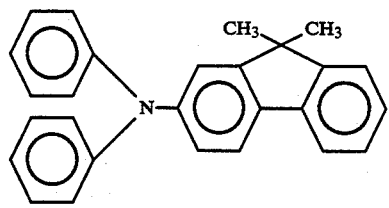

The results are shown in Table 1.

EXAMPLE 11

A liquid dispersion for an electroconductive layer was prepared by dispersing 50 parts of electroconductive titanium oxide powder coated with 10%-antimony oxide-containing tin oxide, 25 parts of a phenol resin, 20 parts of methylcellosolve, 5 parts of ethanol, and 0.002 part of silicone oil with glass beads of 1 mm diameter by means of a sand mill for 2 hours. The liquid dispersion was applied on an aluminum cylinder by dipping, and was dried at 140° C. for 30 minutes to form an electroconductive layer of 20 μm thick.

On the formed electroconductive layer, a solution of 5 parts of N-methoxymethylated nylon in 95 parts of methanol was applied by wire bar coating, and dried at 100° C. for 20 minutes to form an intermediate layer of 0.6 μm thick.

A solution for formation of a charge-generating layer was prepared by dispersing 3 parts of disazo pigment represented by the formula below:

2 parts of polyvinylbenzal (benzalation degree: 80%, weight-average molecular weight: 110,000) and 35 parts of cyclohexanone with glass beads of 1 mm diameter by means of a sand mill for 12 hours, and adding thereto 60 parts of methyl ethyl ketone. The resulting solution was applied on the aforementioned intermediate layer by dip coating and was dried at 80° C. for 20 minutes to form a charge-generating layer of 0.2 μm thick.

A solution for formation of a charge-transporting layer was prepared by dissolving 10 parts of the charge-transporting substance represented by the formula below:

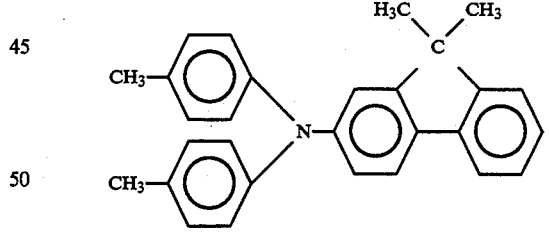

5 parts of the copolymer (viscosity-average molecular weight: $2.05 \times 10^4$) represented by the formula below as Copolymer B:

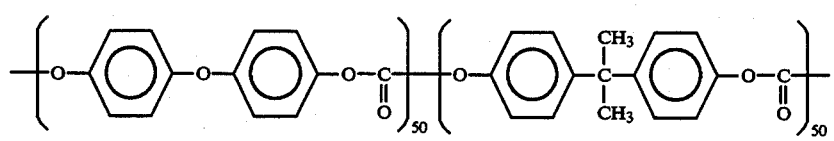

5 parts of the copolymer (viscosity-average molecular weight: $2.21 \times 10^4$) represented by the formula below as Copolymer A:

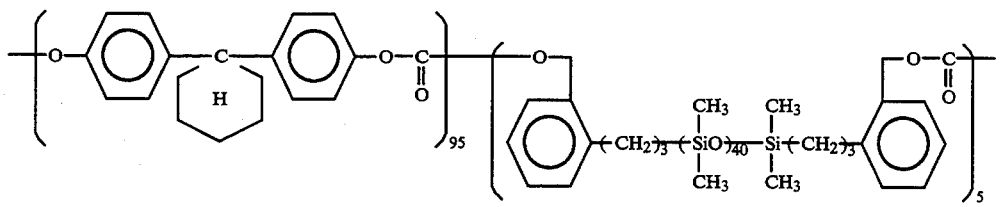

in a mixed solvent of 20 parts of dichloromethane and 40 parts of monochlorobenzene. This solution was applied on the charge-generating layer described above by wire bar coating, and was dried at 120° C. for 60 minutes to form a charge-transporting layer of 23 μm thick.

The resulting electrophotographic photosensitive member was tested for surface lubricity, resistance to deposit formation, resistance to solvent cracking, resistance to toner sticking, resistance to surface abrasion, and sensitivity in the same manner as in Example 1.

The results are shown in Table 2.

EXAMPLE 12

An electrophotographic photosensitive member was prepared and evaluated in the same manner as in Example 11 except that, as Copolymer B, 5 parts of the copolymer (viscosity-average molecular weight: $2.56 \times 10^4$) represented by the formula below was used:

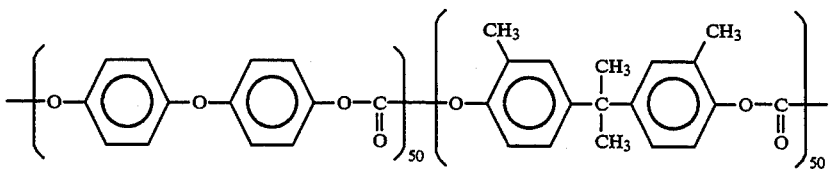

and, as Copolymer A, 5 parts of the copolymer (viscosity-average molecular weight: $2.02 \times 10^4$) represented by the formula below was used:

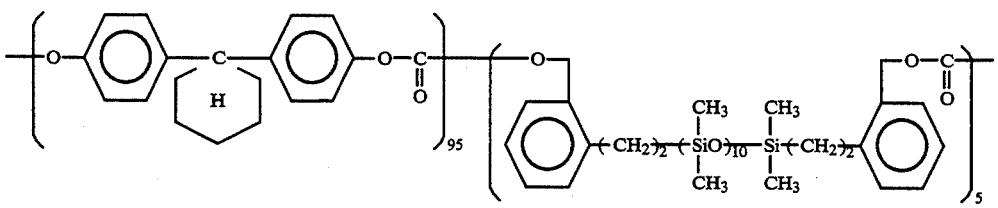

The results are shown in Table 2.

EXAMPLE 13

An electrophotographic photosensitive member was prepared and evaluated in the same manner as in Example 11 except that, as Copolymer B, 8 parts of the copolymer (viscosity-average molecular weight: $8.56 \times 10^4$) represented by the formula below was used:

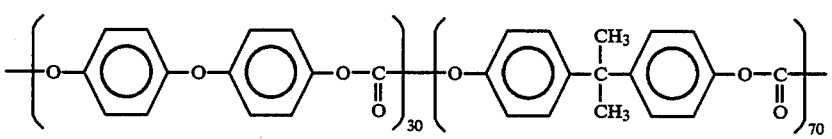

and, as Copolymer A, 2 parts of the copolymer (viscosity-average molecular weight: $2.25 \times 10^4$) represented by the formula below was used:

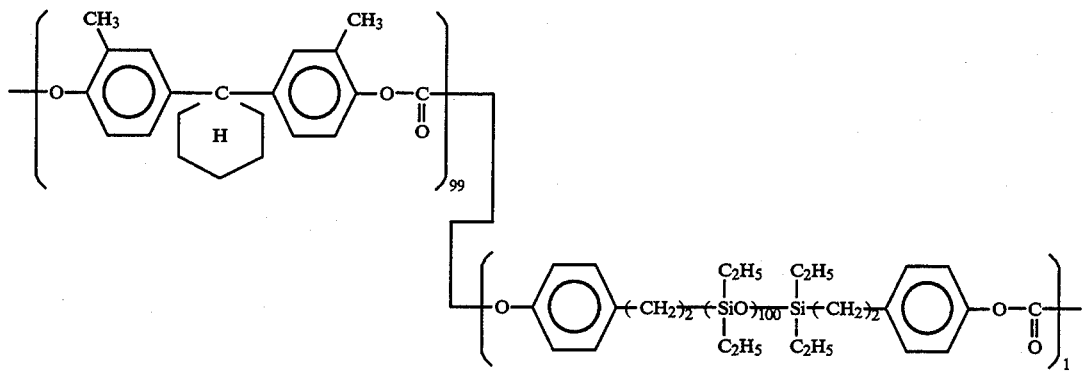

The results are shown in Table 2.

EXAMPLE 14

An electrophotographic photosensitive member was prepared and evaluated in the same manner as in Example 11 except that, as Copolymer B, 2 parts of the copolymer (viscosity-average molecular weight: $3.01 \times 10^4$) represented by the formula below was used:

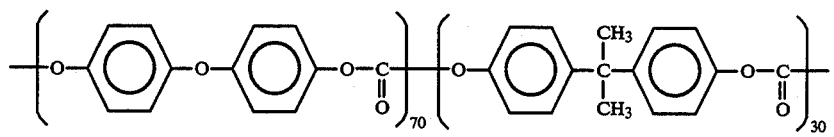

and, as Copolymer A, 8 parts of the copolymer (viscosity-average molecular weight: $2.25 \times 10^4$) represented by the formula below was used:

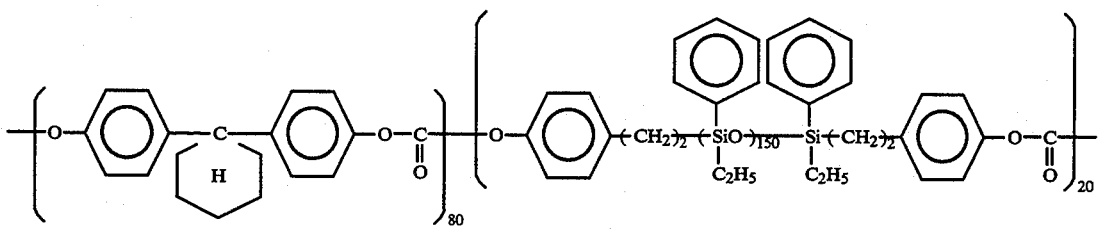

The results are shown in Table 2.

EXAMPLE 15

An electrophotographic photosensitive member was prepared and evaluated in the same manner as in Example 11 except that, as Copolymer B, 5 parts of the copolymer (viscosity-average molecular weight: $3.01 \times 10^4$) represented by the formula below was used:

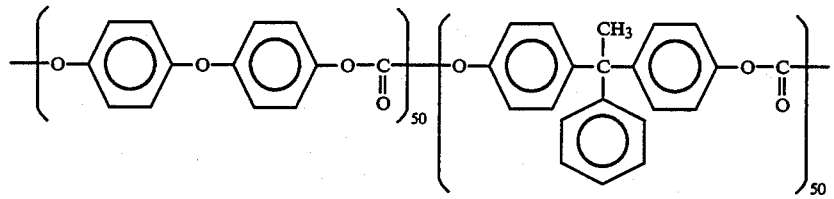

and, as Copolymer A, 5 parts of the copolymer (viscosity-average molecular weight: $3.13 \times 10^4$) represented by the formula below was used:

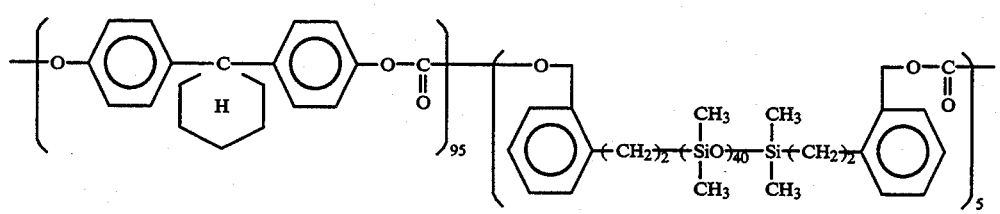

The results are shown in Table 2.

EXAMPLE 16

An electrophotographic photosensitive member was prepared and evaluated in the same manner as in Example 11 except that, as Copolymer A, 5 parts of the copolymer (viscosity-average molecular weight: $2.53 \times 10^4$) represented by the formula below was used:

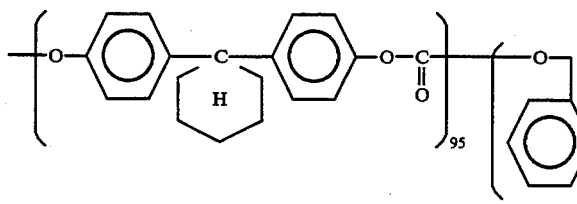

as Copolymer B, 5 parts of the copolymer (viscosity-average molecular weight: $3.25 \times 10^4$) represented by the formula below was used:

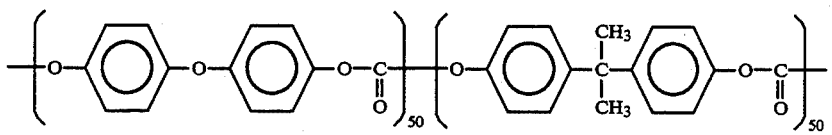

and, as the charge-transporting substance, the compound represented by the formula below was used.

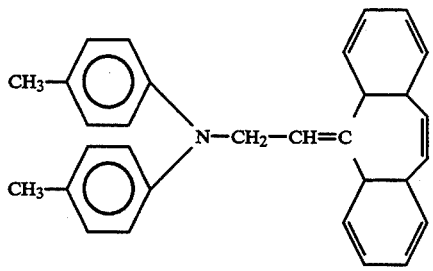

The results are shown in Table 2.

COMPARATIVE EXAMPLE 11

An electrophotographic photosensitive member was prepared and evaluated in the same manner as in Example 11 except that a polycarbonate Z resin (viscosity-average molecular weight: $1.92 \times 10^4$) was used in place of Copolymers A and B. The results are shown in Table 2.

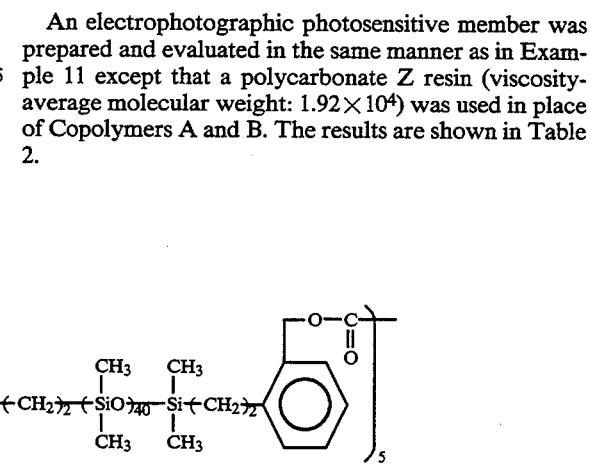

COMPARATIVE EXAMPLE 12

An electrophotographic photosensitive member was prepared and evaluated in the same manner as in Example 11 except that, in place of Copolymers A and B, the copolymer (viscosity-average molecular weight: $2.53 \times 10^4$) represented by the formula below was used:

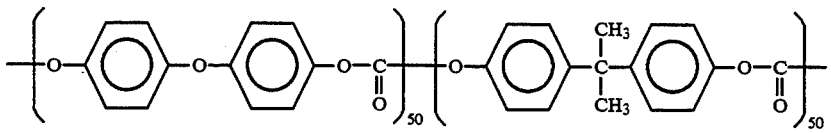

The results are shown in Table 2.

EXAMPLE 17

Layers up to a charge-transportation layer were formed in the same manner as in Comparative Example 1. Then a solution for protection layer was prepared by dissolving, in 190 parts of monochlorobenzene, 2 parts of the copolymer (viscosity-average molecular weight: $2.10 \times 10^4$) represented by the formula below as Copolymer B:

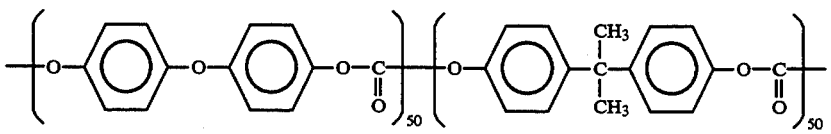

4.5 parts of the copolymer (viscosity-average molecular weight: $2.02 \times 10^4$) represented by the formula below as Copolymer A:

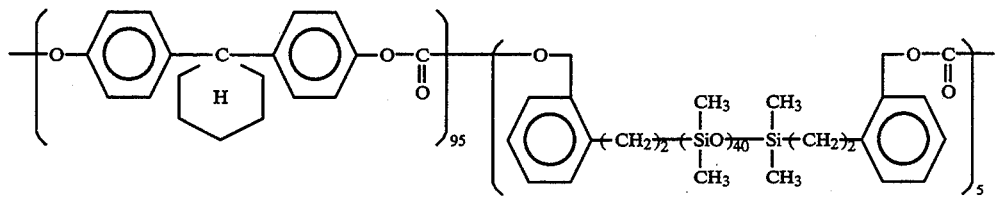

and 1 part of the compound represented by the formula below as the charge-transporting substance:

The resulting solution was applied by spray coating on the charge-transporting layer having formed as above, and was dried to obtain a surface protection layer of 3 μm thick. The resulting electrophotographic photosensitive member was evaluated in the same manner as in Example 11. The results are shown in Table 2.

TABLE 1

| | Surface lubricity (mV/10 mg-load) | Resistance to deposit formation (Days) | Resistance to solvent cracking | | Resistance to toner sticking (× 1000-sheets) | Resistance to abrasion of surface (μm) | Sensitivity (μJ/cm²) |
|---|---|---|---|---|---|---|---|
| | | | Finger fat | Lubricant | | | |
| Example | | | | | | | |
| 1 | 130 | 24 | AA | AA | No sticking | Below 0.5 μm | 0.31 |
| 2 | 180 | 23 | AA | AA | No sticking | Below 0.5 μm | 0.31 |
| 3 | 250 | 27 | A | B | 0.8 | 0.9 | 0.31 |
| 4 | 210 | 21 | AA | AA | 3.9 | Below 0.5 μm | 0.31 |
| 5 | 110 | 28 | A | A | 4.2 | 1.0 | 0.31 |
| 6 | 140 | OVER 30 | AA | AA | No sticking | Below 0.5 μm | 0.30 |
| 7 | 160 | " | AA | AA | No sticking | Below 0.5 μm | 0.30 |
| 8 | 210 | " | A | A | 0.8 | 2.1 | 0.30 |
| 9 | 200 | " | AA | AA | No sticking | 0.7 | 0.30 |
| 10 | 120 | " | AA | AA | 4.5 | 1.1 | 0.30 |
| Comparative Example | | | | | | | |
| 1 | 310 | 10 | AA | A | 2.0 | 1.1 | 0.31 |
| 2 | 2,600 | 4 | AA | AA | 0.5 | 3.0 | 0.32 |
| 3 | 2,900 | 7 | D | D | 1.0 | 4.8 | 0.31 |
| 4 | 2,500 | 9 | A | C | 0.5 | 0.9 | 0.31 |
| 5 | 320 | 13 | A | C | 1.5 | 3.3 | 0.31 |
| 6 | 300 | 10 | AA | A | 2.5 | 1.8 | 0.30 |
| 7 | 2,500 | 7 | AA | AA | 1.0 | 3.5 | 0.30 |
| 8 | 3,100 | 10 | D | D | 2.0 | 6.5 | 0.30 |
| 9 | 2,700 | 9 | A | C | 1.7 | 2.5 | 0.30 |
| 10 | 330 | 16 | A | C | 2.3 | 4.6 | 0.30 |

TABLE 2

| | Surface lubricity (mV/10 mg-load) | Resistance to deposit formation (Days) | Resistance to solvent cracking | | Resistance to toner sticking (× 1000-sheets) | Resistance to abrasion of surface (μm) |
|---|---|---|---|---|---|---|
| | | | Finger fat | Lubricant | | |
| Example | | | | | | |
| 11 | 250 | 18 | A | A | 2.6 | Below 0.5 |
| 12 | 200 | 16 | A | B | 2.9 | 0.7 |
| 13 | 450 | 17 | A | A | 3.5 | 1.1 |
| 14 | 100 | 17 | AA | A | 4.3 | 1.3 |
| 15 | 110 | 20 | AA | A | 2.2 | 0.9 |
| 16 | 240 | 27 | A | B | 1.5 | 0.8 |
| 17 | 160 | 20 | A | B | 3.2 | 0.6 |
| Comparative Example | | | | | | |
| 11 | 3000 | 7 | D | D | 1.3 | 3.2 |
| 12 | 2500 | 7 | A | A | 0.8 | 5.2 |

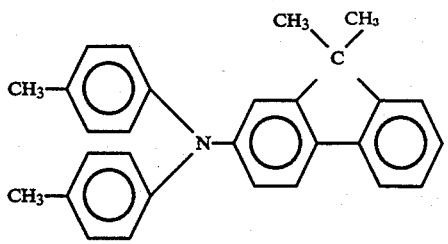

What is claimed is:

1. An electrophotographic photosensitive member comprising an electroconductive support and a photosensitive layer formed thereon: the surface layer of the electrophotographic photosensitive member containing a first copolymer having a first construction unit represented by Formula (1) and a second construction unit represented by Formula (2), and a second copolymer having a third construction unit represented by Formula (3) and a fourth construction unit represented by Formula (4):

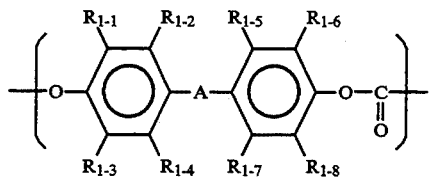

wherein A is a group of alkylidene, arylene, arylenedialkylidene, —O—, —S—, —CO—, —SO—, or —SO$_2$—, and R$_{1\text{-}1}$ to R$_{1\text{-}8}$ are independently a hydrogen atom, an alkyl group, an aryl group, or a halogen atom;

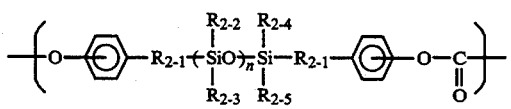

wherein R$_{2\text{-}1}$ is an alkylene group or an alkylidene group, and R$_{2\text{-}2}$ to R$_{2\text{-}5}$ are independently a hydrogen atom, an alkyl group, or an aryl group, and n is an integer of 1 to 200;

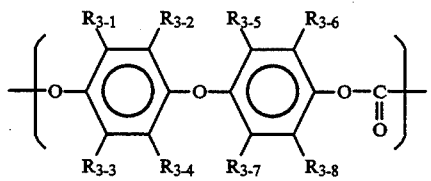

wherein R$_{3\text{-}1}$ to R$_{3\text{-}8}$ are independently a hydrogen atom, an alkyl group, an aryl group, or a halogen atom;

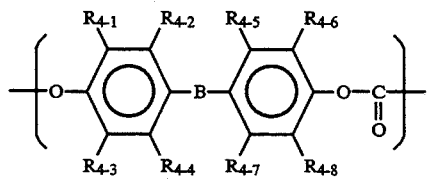

wherein B is an alkylidene group, an arylene group, and an arylenedialkylidene group, and R$_{4\text{-}1}$ to R$_{4\text{-}8}$ are independently a hydrogen atom, an alkyl group, an aryl group, or a halogen atom.

2. An electrophotographic photosensitive member according to claim 1, wherein the surface layer further contains a polycarbonate having a construction unit represented by Formula (9) below:

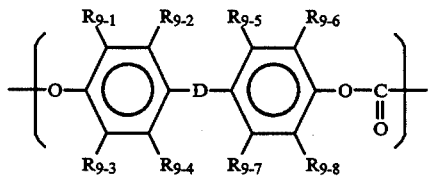

wherein D is a group of alkylidene, arylene, or arylenedialkylidene; and R$_{9\text{-}1}$ to R$_{9\text{-}8}$ are independently a hydrogen atom, an alkyl group, an aryl group or a halogen atom.

3. An electrophotographic photosensitive member according to claim 1, wherein the surface layer is a photosensitive layer.

4. An electrophotographic photosensitive member according to claim 3, wherein the photosensitive layer comprises a charge-generating layer and a charge-transporting layer, and the charge-transporting layer is the surface layer.

5. An electrophotographic photosensitive member according to claim 1, wherein the electrophotographic photosensitive member has a protection layer on the photosensitive layer, and the protection layer is the surface layer.

6. An electrophotographic photosensitive member according to claim 1, wherein the electrophotographic photosensitive member has a subbing layer between the electroconductive support and the photosensitive layer.

7. An electrophotographic photosensitive member according to claim 2, wherein the surface layer is a photosensitive layer.

8. An electrophotographic photosensitive member according to claim 7, wherein the photosensitive layer comprises a charge-generating layer and a charge-transporting layer, and the charge-transporting layer is the surface layer.

9. An electrophotographic photosensitive member according to claim 2, wherein the electrophotographic photosensitive member has a protection layer on the photosensitive layer, and the protection layer is the surface layer.

10. An electrophotographic photosensitive member according to claim 2, wherein the electrophotographic photosensitive member has a subbing layer between the electroconductive support and the photosensitive layer.

11. An electrophotographic apparatus, comprising an electrophotographic photosensitive member, an image-forming means for forming an electrostatic latent image, a developing means for developing the formed latent image, and a transferring means for transferring the developed image to an image-receiving material; said electrophotographic photosensitive member comprising an electroconductive support and a photosensitive layer formed thereon: the surface layer of the electrophotographic photosensitive member containing a first copolymer having a first construction unit represented by Formula (1) and a second construction unit represented by Formula (2), and a second copolymer having a third construction unit represented by Formula (3) and a fourth construction unit represented by Formula (4):

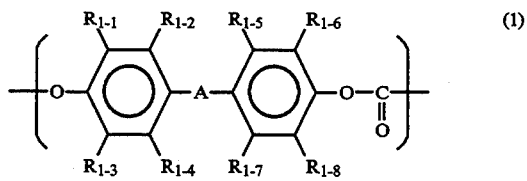

wherein A is a group of alkylidene, arylene, arylenedialkylidene, —O—, —S—, —CO—, —SO—, or —SO$_2$—, and R$_{1\text{-}1}$ to R$_{1\text{-}8}$ are independently a hydrogen atom, an alkyl group, an aryl group, or a halogen atom;

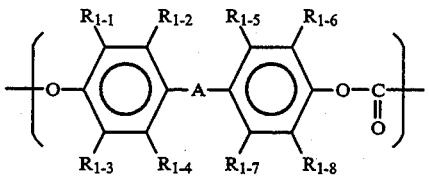

(1)

wherein A is a group of alkylidene, arylene, arylenedialkylidene, —O—, —S—, —CO—, —SO—, or —SO$_2$—, and R$_{1-1}$ to R$_{1-8}$ are independently a hydrogen atom, an alkyl group, an aryl group, or a halogen atom;

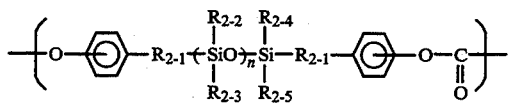

(2)

wherein R$_{2-1}$ is an alkylene group or an alkylidene group, and R$_{2-2}$ to R$_{2-5}$ are independently a hydrogen atom, an alkyl group, or an aryl group, and n is an integer of 1 to 200;

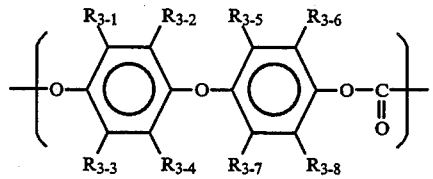

(3)

wherein R$_{3-1}$ to R$_{3-8}$ are independently a hydrogen atom, an alkyl group, an aryl group, or a halogen atom;

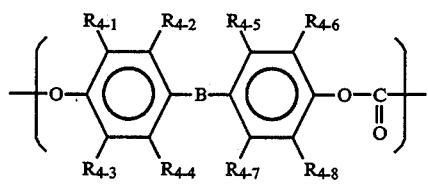

(4)

wherein B is an alkylidene group, an arylene group, and an arylenedialkylidene group, and R$_{4-1}$ to R$_{4-8}$ are independently a hydrogen atom, an alkyl group, an aryl group, or a halogen atom.

12. A device unit, comprising an electrophotographic photosensitive member, and at least one means selected from the group consisting of a charging means, a developing means, and a cleaning means; said electrophotographic photosensitive member comprising an electroconductive support and a photosensitive layer formed thereon: the surface layer of the electrophotographic photosensitive member containing a first copolymer having a first construction unit represented by Formula (1) and a second construction unit represented by Formula (2), and a second copolymer having a third construction unit represented by Formula (3) and a fourth construction unit represented by Formula (4):

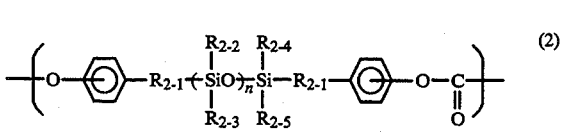

(2)

wherein R$_{2-1}$ is an alkylene group or an alkylidiene group, and R$_{2-2}$ to R$_{2-5}$ are independently a hydrogen atom, an alkyl group, or an aryl group, and n is an integer of 1 to 200;

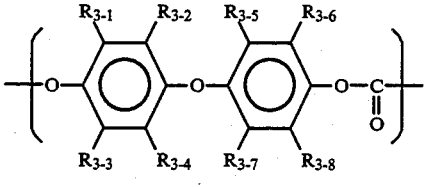

(3)

wherein R$_{3-1}$ to R$_{3-8}$ are independently a hydrogen atom, an alkyl group, an aryl group or a halogen atom;

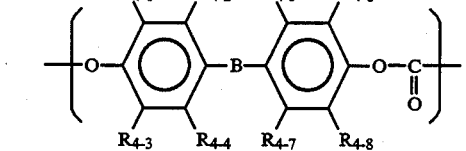

(4)

wherein B is an alkylidene group, an arylene group, and an arylenedialkylidene group, and R$_{4-1}$ to R$_{4-8}$ are independently a hydrogen atom, an alkyl group, an aryl group, or a halogen atom; and said unit supporting integrally the electrophotographic photosensitive member and said at least one of the charging means, the developing means, and the cleaning means, and being removable from the main body of an electrophotographic apparatus.

* * * * *

UNITED STATES PATENT AND TRADEMARK OFFICE
CERTIFICATE OF CORRECTION

PATENT NO. : 5,418,099
DATED : May 23, 1995
INVENTOR(S) : SHINYA MAYAMA, ET AL.

It is certified that error appears in the above-indentified patent and that said Letters Patent is hereby corrected as shown below:

COLUMN 1

Line 52, "involves" should read --is involved in--.

COLUMN 2

Line 39, "Further" should read --Further,--.

COLUMN 18

Line 13, "0.1 μμm" should read --0.1 μm--.

COLUMN 21

Line 52, "urethan" should read --urethane--.

COLUMN 36

Line 21, "alkylidiene" should read --alkylidene--.

Signed and Sealed this

Eighth Day of August, 1995

Attest:

BRUCE LEHMAN

*Attesting Officer*  *Commissioner of Patents and Trademarks*